2,956,928
Patented Oct. 18, 1960

2,956,928

PROCESS FOR PREPARING PROTEOLYTIC ENZYME FROM FIG SAP LATEX

Jocelyn F. Douglas, Nixon, and Eugene R. L. Gaughran, New Brunswick, N.J., assignors to Johnson & Johnson, a corporation of New Jersey No Drawing. Filed Nov. 2, 1956, Ser. No. 619,946

1 Claim. (Cl. 195—66)

This invention relates to a stable proteolytic enzyme containing about 14% by weight nitrogen, the remainder being carbon, hydrogen, oxygen and sulphur, which enzyme has an unusually high proteolytic activity; and the invention relates also to methods of producing such an enzyme, including selectively separating the same from clarified fig sap latex and then freeze drying it.

Proteolytic enzymes contained in fig sap latex, as well as the solid obtained therefrom by oven or drum drying techniques are known and have achieved considerable commercial success. However, the art is confronted by the problems of removing from such material various undesirable features including peroxidase activity and disagreeable odor, and also with the problem of providing such a material having higher proteolytic activity.

The discoveries associated with the invention relating to solution of the above problems, and the objects achieved in accordance with the invention as set forth herein include: the provision of a solid proteolytic enzyme essentially comprising a protein, which enzyme has an unusually high proteolytic activity, is free from peroxidase, and is lethal to Ascaris (intestinal porcine parasites); the provision of such an enzyme which is relatively free from disagreeable odor; the provision of a process for preparing such an enzyme from clarified fig sap latex by selectively separating the enzyme factor from the latex; the provision of such a process wherein the factor is separated from the aqueous clarified fig sap by means of a protein precipitating agent; the provision of such a process wherein the precipitate material is dialyzed to remove inorganic materials and then frozen and dried at below freezing temperatures to obtain a stable dry powder product; and other objects which will be apparent as details or embodiments of the invention as set forth hereinafter.

In connection with the present description, the following tests are used as standard.

*Standard spun collagen breaking time test*

The activity of proteolytic enzymes may be determined by a standard procedure in which a thread consisting of 40 filaments of spun collagen fiber (prepared by known methods) is suspended in an aqueous test solution at 98.6° F. The test solution is buffered at a pH of 5 by McIlvaine's buffer. The collagen thread has a weight of about 113 milligrams per meter. It is held under tension by a 2-gram weight. In a series of tests, the concentration of the solution is varied until a concentration is found which causes the fiber to break in 30 minutes. The numerical value thereof is the inverse of the activity of the enzyme; that is, the higher the concentration, the weaker the enzyme.

*Peroxidase activity test*

The peroxidase activity unit is measured as the number of milligrams of purpurogallin formed per milligram of powder from pyrogallol and hydrogen peroxide at 68% F., pH 6.0, in aqueous phosphate buffer (Sorenson) during a 20 second incubation period.

*Standard Ascaris assay test*

To 100 ml. of 1% by weight solution of the protein powder in pH 5.0 McIlvaine's buffer at 98.6° F. add one living intestinal porcine parasite (Ascaris) and allow to stand at 98.6° F. for 10 hours. If, at this time, the worm is dead (preferably fragmented into a plurality of sections), the protein is regarded as lethal to this type of organism.

*Standard milk clotting test*

A 12% solution of milk powder in distilled water is brought to pH 5.5 with 5% lactic acid, and 5 ml. of this material is then incubated at 37° C. until up to temperature and 1 ml. of enzyme solution is added. The mixture is then incubated at 37° C. The time required for clotting of the milk is a measure of enzyme activity. The shorter the time, the greater the activity.

In order to facilitate a clear understanding of the invention, the following preferred specific embodiments are described in detail.

EXAMPLE 1

A raw fig sap latex containing proteolytic enzyme (from *Ficus laurifolia* or *Ficus glabrata* or *Ficus carica*) is first clarified by filtration or centrifugation, or both, using conventional equipment constructed of corrosion-resistant metal or alloy, such as stainless steel.

The clarified liquid (1000 parts by weight) is then treated at 40° F. with an inorganic precipitating agent such as ammonium sulphate, in an amount to give a concentration in the range of 30 to 40% of saturation of this salt in water (211.5 to 282.0 parts by weight of the salt in the liquid mixture) whereby the enzyme is selectively precipitated. If higher concentrations of the salt are used, undesirable impurities are also precipitated with the enzyme, giving a less active product. If lower concentrations are used, the active principle is not precipitated out.

The resulting precipitate is separated, e.g., by filtration or centrifugation, suspended in one-half strength McIlvaine's buffer at pH 5.0 (citric acid and di-sodium phosphate; "Handbook of Chemistry and Physics," Chemical Rubber Publishing Co., 30th edition, 1947, page 1405, McIlvaine standard buffer) and then dialyzed through a cellophane membrane against distilled water until all inorganic ions are removed therefrom (as determined by a check test of the distilled water), filtered, and then frozen and dried in the frozen state (in conventional apparatus) whereby a light tan, stable, powder product is obtained.

At 1% by weight concentration, the product is completely soluble in pH 5.0 McIlvaine's buffer at 68° F.

In the standard spun collagen breaking test for this product, the concentration is 0.1%; whereas for commercial ficin, an 0.3% concentration is required to cause a break in 30 minutes. That is, this product shows a 3- to 4-fold higher activity.

In the standard Ascaris assay test, this product is lethal to the organism and breaks it up into three or more body fragments.

In the sandard milk clotting test, 0.01% of this product clots the milk within 4 minutes; whereas in similar weight concentration commercial ficin requires about 11 minutes. That is, an about 3-fold difference.

As to peroxidase content, this product contains none; whereas commercial ficin contains at least 0.5 unit per mg. It is odor-free.

EXAMPLE 2

The procedure of Example 1 is repeated, except that sodium sulfate is used at a concentration in the range of 95 to 100% of saturation of this salt in water, and comparable results are obtained; the spun collagen breaking time is 24 minutes for an 0.1% concentration, and is 20 minutes for an 0.2% concentration, the product contains no peroxidase, and the milk clotting time is 2.4 minutes for an 0.01% solution of this product.

EXAMPLE 3

The procedure of Example 1 is repeated, except that potassium sulfate is used at a concentration in the range of 80 to 100% of saturation of this salt in water, and comparable results are obtained; the spun collagen breaking time is 24 minutes for an 0.1% concentration and is 21 minutes for an 0.2% concentration, the product contains no peroxidase, and the milk clotting time is 2.5 minutes for an 0.01% solution of this product.

EXAMPLE 4

The procedure of Example 1 is repeated, except that sodium acetate is used at a concentration in the range of 80 to 100% of saturation of this salt in water, and comparable results are obtained; the spun collagen breaking time is 28 minutes for an 0.1% concentration and is 24 minutes for an 0.2% concentration, the product contains no peroxidase, and the milk clotting time is 2.3 minutes for an 0.01% solution of this product.

EXAMPLE 5

The procedure of Example 1 is repeated, except that potassium phosphate monobasic is used at a concentration in the range of 40 to 100% of saturation of this salt in water, and comparable results are obtained; the spun collagen breaking time is 25 minutes for an 0.1% concentration and is 23 minutes for an 0.2% concentration, the product contains no peroxidase, and the milk clotting time is 2.5 minutes for an 0.01% solution of this product.

EXAMPLE 6

The procedure of Example 1 is repeated, except that sodium chloride is used at a concentration in the range of 40 to 60% of saturation of this salt in water, and comparable results are obtained; the spun collagen breaking time is 24 minutes for an 0.1% concentration and is 22 minutes for an 0.2% concentration, the product contains no peroxidase, and the milk clotting time is 2.7 minutes for an 0.01% solution of this product.

EXAMPLE 7

The procedure of Example 1 is repeated, except that magnesium sulfate is used at a concentration in the range of 40 to 80% of saturation of this salt in water, and comparable results are obtained; the spun collagen breaking time is 25 minutes for an 0.1% concentration and is 23 minutes for an 0.2% concentration, the product contains no peroxidase, and the milk clotting time is 2.6 minutes for an 0.01% solution of this product.

EXAMPLE 8

To 1 part by volume of a clarified latex prepared in accordance with Example 1, is added 1 part by volume of acetone, and the resulting precipitate is separated. To the resulting liquid there is added additional acetone to bring the concentration up to 2 to 3 parts by volume of acetone per part of latex, and the resulting precipitate is recovered as the desired product.

If higher concentrations of acetones are used in the preliminary precipitating step, lower yields of the desired product are obtained. If lower concentrations of acetone are used in the preliminary precipitating step, the desired product may be contaminated by peroxidase. If higher concentrations of acetone are used in the final step, undesirable impurities are precipitated and these tend to give a product of undesirable toxicity and odor characteristics. If lower concentrations of acetone are used in the final step, lower yields of the desired products are obtained.

The resulting precipitated material may be freeze-dried directly, following the procedure of Example 1, to give a light tan color, stable, powder product.

The resulting product is substantially equivalent to that of Example 1; the spun collagen breaking time is 25 minutes for an 0.1% concentration, and is 23 minutes for an 0.2% concentration, the product contains no peroxidase, and the milk clotting time is 2.4 minutes for an 0.01% solution of this product.

EXAMPLE 9

The procedure of Example 8 is repeated, except that ethanol is used as the precipitating agent, the preliminary precipitation being at a concentration of 2 to 1, and the final precipitation being at a concentration in the range of 3 to 4 volumes of ethanol per volume of latex (volume at start), and comparable results are obtained; the spun collagen breaking time is 24 minutes for an 0.1% concentration and is 22 minutes for an 0.2% concentration, the product contains no peroxidase and the milk clotting time is 2.9 minutes for an 0.01% solution of this product.

EXAMPLE 10

The procedure of Example 8 is repeated, except that methanol is used as the precipitating agent, the preliminary precipitation being at a concentration of 3 to 1 by volume, and the final precipitation being at a concentration in the range of 4 to 5 parts by volume of methanol per part of latex, and comparable results are obtained; the spun collagen breaking time is 25 minutes for an 0.1% concentration and is 22 minutes for an 0.2% concentration, the product contains no peroxidase, and the milk clotting time is 2.3 minutes for an 0.01% solution of this product.

The above described products also show elastase activity.

In addition to the conventional uses for ficin type material, the products of the invention may be used for chillproofing beer (e.g., removal of protein haze by adding about 0.01% by weight of the present product to the beer at any time after boiling of the wort), degumming of silk (e.g., separation and cleaning of the fibers by treating the silk material with an aqueous solution containing about 1% of the present product), removal of protein stains and the like in laundry and dry cleaning operations (e.g., by adding 0.5 to 1% of the present product to the regular cleaning fluid or bath), desizing of textile material (e.g., removal of protein size by adding about 1% of the present product to an aqueous treating liquid) dehairing of hides (e.g., removal of hair from skins by treating with an aqueous liquid containing 0.5 to 1% of the present product), bating of hides (e.g., removal of degradation products of hair, glands, epidermis and other materials not removed in previous operations by treating with an aqueous liquid containing about 1 to 10% of the present product), and the like.

In view of the foregoing disclosures, variations or modifications thereof will be apparent, and it is intended to include within the invention all such variations and modifications except as do not come within the scope of the appended claim.

We claim:

A process for preparing a stable, peroxidase-free, powdered proteolytic enzyme which comprises clarifying by filtration a fig sap latex of the group consisting of *Ficus laurifolia, Ficus glubrata* and *Ficus carica*, precipitating an enzyme component from said clarified latex by dissolution of ammonium sulfate in the latex in an amount of from 30% to 40% of saturation, separating said precipitated enzyme component from said latex by centrifugation, suspending said separated enzyme component in a citrate buffer solution at a pH of 5, dialyzing the buffered enzyme suspension through a cellophane membrane against distilled water to remove inorganic ions, freezing the dialyzed suspension of enzyme and drying the frozen suspension whereby a stable dry powder product is obtained, said product having a spun collagen thread breaking concentration of about 0.1%.

References Cited in the file of this patent

UNITED STATES PATENTS

| | | |
|---|---|---|
| 1,616,291 | Weyland | Feb. 1, 1927 |
| 1,892,247 | Neugebauer | Dec. 27, 1932 |
| 2,162,737 | Major et al. | June 20, 1939 |
| 2,163,643 | Walti | June 27, 1939 |

OTHER REFERENCES

Tauber: Chemistry and Technology of Enzymes, 1949, published by John Wiley & Sons Inc. (N.Y.), pp. 160 to 167.

Flosdorf: Freeze Drying, 1949, published by Reinhold Pub. Corp. (N.Y.), pp. 108 and 111.

Sumner et al.: Chemistry and Methods of Enzymes, 1953, 3rd ed., pub. by Academic Press, Inc. (N.Y.), pp. 57 and 58.